(No Model.)
A. G. HULBERT.
WIRE NETTING.
No. 295,251. Patented Mar. 18, 1884.
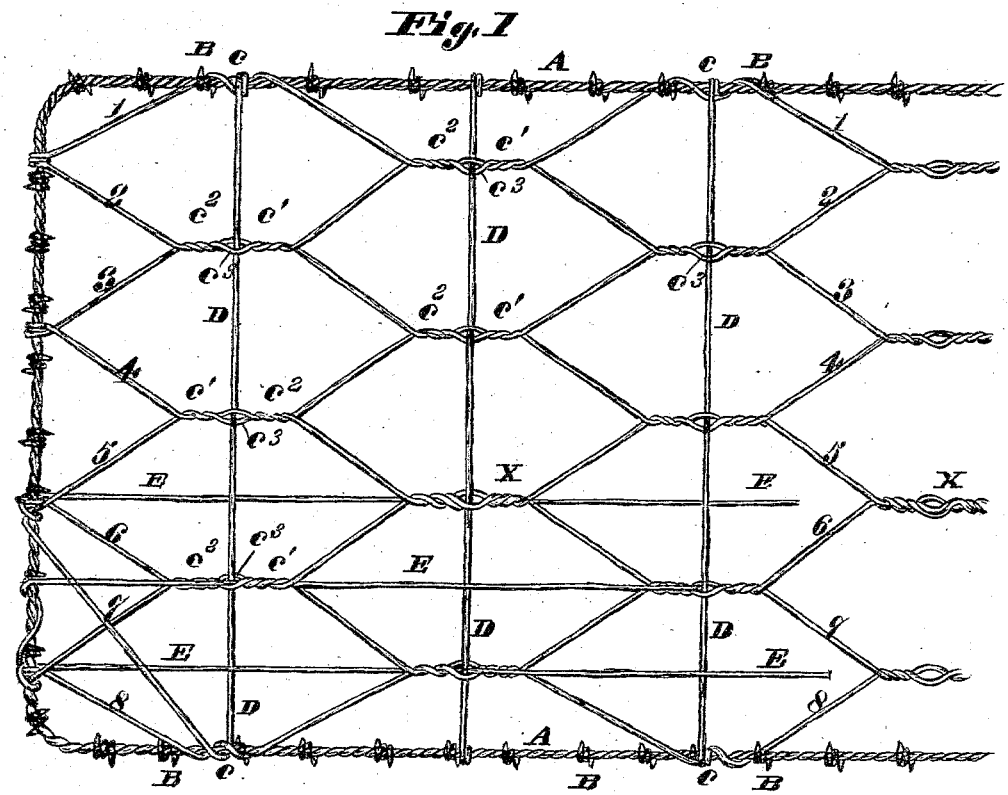
Fig. 1
Fig. 2. Fig. 3.
Fig. 4.
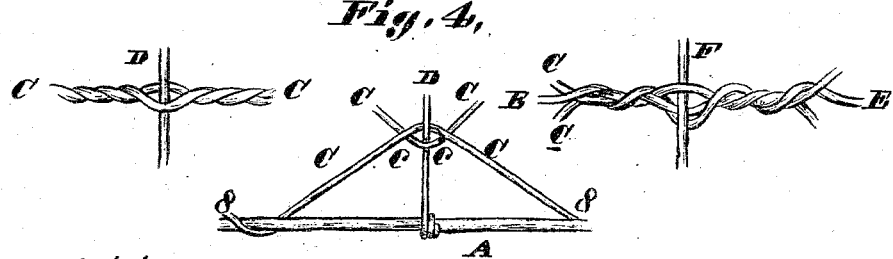
Attest:
Charles Pickles
Wm H Fayerd
Inventor:
Arthur G. Hulbert
By Knight Bro
Attys.

UNITED STATES PATENT OFFICE.

ARTHUR G. HULBERT, OF ST. LOUIS, MISSOURI.

WIRE-NETTING.

SPECIFICATION forming part of Letters Patent No. 295,251, dated March 18, 1884.

Application filed May 8, 1883. (No model.)

*To all whom it may concern:*

Be it known that I, ARTHUR G. HULBERT, of the city of St. Louis, in the State of Missouri, have invented a certain new and useful Improvement in Wire-Netting for Fencing and other Purposes, of which the following is a full, clear, and exact description, reference being had to the accompanying drawings, forming part of this specification.

My invention consists in the construction hereinafter described and pointed out in the claims.

Figure 1 is a side view of netting having the novelties claimed. Figs. 2, 3, and 4 are enlarged details.

A A are the selvage wires or cables. These are shown consisting of two or more wires twisted together and furnished with barbs B. The selvage may consist of one or more wires, and may carry barbs or not, as may be required.

C are intermediate longitudinal wires, that in all, or almost all, cases are of smaller diameter than the selvages A. Those wires C next to the selvage upon each side are connected to the selvages at certain distances by coils $c$, turned around the selvages. Each of these side wires, C, at a point intermediate between two coils, $c$, is connected to the next longitudinal wire C by a right twist, $c'$, and a left twist, $c^2$, and between the said right and left twists I prefer to form eyes $c^3$, through which, in certain cases, I pass vertical rods D or horizontal rods E, or both. The rods D or E may be round wires or flat strips, or, in fact, may have any sectional shape. The purpose of the rods, wires, or strips is threefold—viz., to lessen the size of the meshes, to make the fence more visible, and to add to its rigidity. The parts D and E may be made single or of two or more wires or strips coiled together or extending side by side. The wires C may also be made with more than one strand.

In making my netting I stretch any number of wires C, of a suitable size, from stationary spools or reels, from which they may be drawn off parallel to each other to a reel upon which the finished fabric is to be wound. On each side of this series of wires, and in a plane with the same, I extend a preferably heavier wire or cable, A, intended for a selvage, said selvage-wire extending from a stationary spool to the winding-drum. I, however, mount the spool of the body-wires C nearest to the selvages A, so as to be conveniently passed around the selvage-wire by attaching it to the periphery of a wheel, the center of whose axis is the selvage-wire, or by having the spool detached and passing it around by hand. Having thus arranged the wires, I proceed to unite intermediate sections of each with the next wire on each side of it alternately, as follows: Beginning at the reeling-drum, I bring two wires C at one side, as those 1 and 2, into contact in the slot of a simple wrench or tool, or upon each side of a toggle-pin or lever, F, Fig. 3, and intertwine the wires by turning the tool or lever. In Figs. 1, 2, and 3 the wires are shown as having received more than a single turn, while in Fig. 4 they have been turned together only sufficiently to keep them from slipping upon each other, and to allow the passage of a vertical wire, rod, or slot, D, which assists to hold the parts together. Wires 3 and 4 are then united in a similar manner; then 5 with 6, and so on, according to the number of wires C forming the body of the fabric. Then at a point more distant from the reel the wire 1, spool and all, is passed one or more times around the selvage wire or cable A. The wires 2 and 3 are then twisted together at a point equally distant from the reel to the selvage connection, then the wires 4 and 5, and so on, and then the wire, as 8, at the other edge of the body is coiled around the margin-wire at that edge in the same manner as the wire 1 at the other margin or selvage. The operation proceeds in this manner, and as the fabric is completed it is coiled upon the reel. When a light twist is made, as shown in Fig. 4, the rods, wires, or slats D should be put in as the locking-twists are made. The rods, wires, or slats E, running longitudinally in the fabric, may be applied subsequently, or at this time, unless they are secured by twisting with the wires C when the locking-twists are made, as seen at X, Fig. 1.

I prefer to finish the netting with a rust-proof coating by immersing or passing it through a kettle of melted zinc, or a vat of any kind of paint suitable for the purpose; or I employ wires previously coated. When I pass the fabric through molten metal, the result is to fix rigidly all points of contact between separate wires.

I am aware that wire-nettings have been before made with meshes having substantially the same form as mine; but in these the locking-twists have been in one direction (right or left) only, and consequently the wire-spools had to be passed around the wires. Such locking-twists are believed never to have had an eye for the passage of wires or strips D E.

I claim herein as new and of my invention—

1. A wire-netting formed from continuous wires connected to the nearest wire on each side alternately by right and left twists to form elongated hexagonal meshes, as set forth.

2. A wire-netting formed from continuous wires connected to the adjacent wire on each side alternately by right and left twists to form hexagonal meshes, and selvage-wires connected thereto by the outer wires passed bodily around the selvage-wires, as set forth.

3. The combination of body-wires C, connected by right and left twists $c'$ $c^2$, and vertical wire D, passing through eyes $c^3$ in the twist.

4. The combination, in wire-netting, of body-wires C, connected by right and left twists, with eyes $c^3$ therein, and longitudinal wires or strips passing through said eyes or twists.

5. The combination of body-wires C, connected by right and left twists forming eyes $c^3$, and the vertical and longitudinal wires passing through the eyes, as set forth.

ARTHUR G. HULBERT.

Witnesses:
SAML. KNIGHT,
GEO. H. KNIGHT.